(No Model.)
H. T. JOHNSON.
GALVANIC BATTERY.
No. 511,434. Patented Dec. 26, 1893.
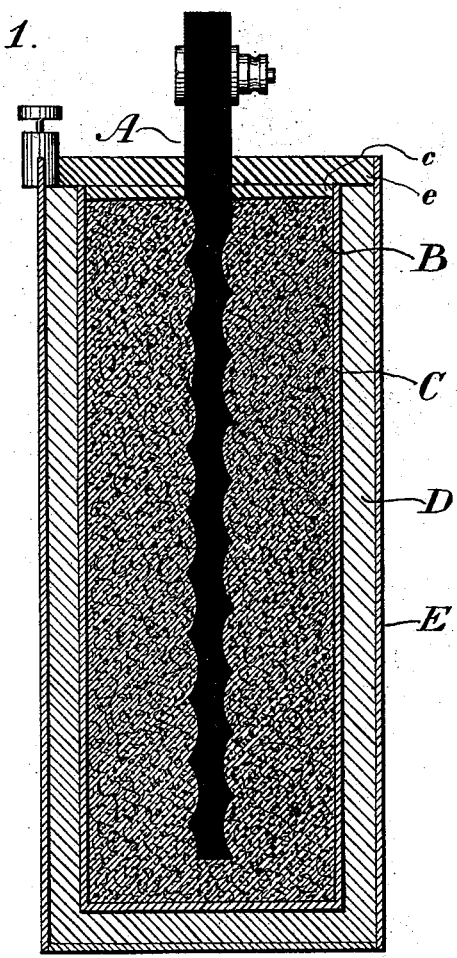
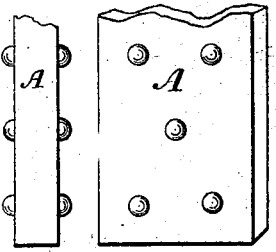
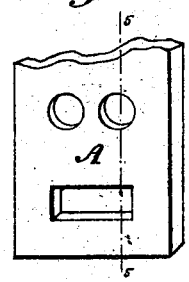
WITNESSES:
Frank B. Packard
W. W. Shaw
INVENTOR
Harry T. Johnson,
BY
Murphey & Metcalf
ATTORNEYS.

UNITED STATES PATENT OFFICE.

HARRY T. JOHNSON, OF NEW YORK, N. Y.

GALVANIC BATTERY.

SPECIFICATION forming part of Letters Patent No. 511,434, dated December 26, 1893.

Application filed April 21, 1893. Serial No. 471,250. (No model.)

*To all whom it may concern:*

Be it known that I, HARRY T. JOHNSON, a citizen of the United States, and a resident of the city, county, and State of New York, have invented certain new and useful Improvements in Galvanic Batteries, of which the following is a full, clear, and exact description, reference being had to the accompanying drawings, forming part of this specification.

My invention relates to that class of primary batteries or cells, popularly known as "dry batteries," in which the negative electrode, usually formed of retort carbon, is surrounded with a semi solid depolarizing conducting-mixture. The depolarizing layer of the cell, which is ordinarily in contact with the negative electrode, sometimes consists of granulated or powdered carbon, but more often it is formed of a mixture of carbon and peroxide of manganese in a comminuted or powdered condition.

The object of my invention is to provide for a more intimate and tenacious contact between the surface of the negative electrode and the surrounding substance, and thereby prevent such contact from becoming impaired and unduly increasing the internal resistance of the cell; and to this end my invention consists of a galvanic battery of the character described, having the negative electrode formed with an uneven contact surface which will operate to bind or wedge the electrode in position, and to reduce the tendency of the surrounding mass to fall away from the surface of the electrode, either through shrinkage, or settling of the mass under ordinary conditions of use, or through careless handling of the cell in transportation or setting up.

In the accompanying drawings, Figure 1 is a central sectional elevation of a galvanic cell embodying my invention. Figs. 2 and 5 are vertical sections, and Figs. 3 and 4 are sectional views in a perspective of modified constructions of my improved form of electrode.

Similar letters of reference are employed to designate corresponding parts in all the views.

In the specific form of battery shown in the drawings, A designates the negative electrode which, in the construction shown, is formed of hard or retort carbon. Surrounding the electrode A is a layer B of finely divided carbon and manganese mixed in approximately equal quantities, and packed tightly around the electrode A, either by tamping or hydraulic pressure. Surrounding and inclosing the layer B is a cup or diaphragm C of porous substance. I have derived the best results by constructing the cup or diaphragm C of heavy absorbent paper, such as blotting paper; but where said cup or diaphragm is employed, other materials may be employed therefor. Around the cup or diaphragm C lies a layer D of semi solid substance containing an exciting salt, such as sal ammoniac. The layer D is preferably formed by dissolving the sal ammoniac in water and mixing sufficient plaster of paris therewith to cause the mass to set and form a semi solid substance when poured into place. The zinc cup E serves both as a containing vessel and positive electrode for the cell. The cups C and E are covered with the layers of bitumen c and e, and the electrodes are provided with the usual binding screws.

The negative electrode A, instead of having all the surfaces thereof which contact with the depolarizing layer B, flat and comparatively smooth, as they have been heretofore constructed, has one or more of its surfaces—preferably both of its widest sides—formed with an uneven surface, as shown. This uneven contacting surface may be produced by forming transverse parallel grooves or depressions therein extending across the face of the carbon, as shown in Fig. 1, as well as in many other ways, as for instance by forming knobs or projections thereon as shown in Figs. 2 and 3, or by perforating, slotting or recessing the electrode, as shown in Figs. 4 and 5. I prefer the use of the transverse grooves, ridges or corrugations however, as they tend to hold the carbon more firmly in place.

The advantages of my improved construction, which is applicable to any of the different makes of dry batteries on the market, are obvious. In a cell constructed with a smooth electrode such as heretofore used, the falling away of the substance surrounding the electrode, which is very apt to occur, either through the settling of the mass, or through its shrinkage caused by the evaporation of the moisture which it contains, or through careless handling in transportation or setting up, will by destroying the contact between the electrode and such substance greatly increase the internal resistance of the cell and impair its efficiency; but with my improved electrode, having an uneven contact surface, if the surrounding mass settles or shrinks slightly, it will still remain in contact with the electrode, and the protuberances or depressions on the surface of the electrode cause the surrounding particles to wedge it much more tightly in place and render it much less likely to become displaced by careless handling of the cell.

Another serious defect which is often found in dry batteries as heretofore constructed arises when the seal closing the top of the cell becomes cracked, broken or loosened. Where this occurs, the smooth surfaces of the carbon or negative electrode heretofore employed present no obstacle to its vertical movement in the surrounding mass, and if the cell be lifted by the electrode, as is frequently necessary, the same will be drawn bodily out of the cell. As it is then difficult, if not impossible, to replace it properly, the cell is thus completely ruined; but with my improved electrode, its uneven surface causes it to be wedged tightly in place by the packing of the mass B around it, and even if the seal be entirely destroyed, the electrode will be so firmly gripped thereby that it cannot become accidentally displaced. It will also be observed that these advantages are attained without any substantial increase in the cost of the cell, and also without complicating its construction or increasing the number of its parts.

I use the term "uneven surface" herein to denote a surface which is provided with projections, depressions, perforations or recesses, either in regular or irregular arrangement.

Having thus described my invention, what I claim as new, and desire to secure by Letters Patent, is—

1. In a dry battery, the combination of a containing cup or cylinder forming the positive electrode, a semi solid filling within the same, and a negative electrode having an uneven surface embedded in said filling, substantially as and for the purpose set forth.

2. In a galvanic battery, the combination of a cup shaped positive electrode, a porous diaphragm or cup within the same, a semi solid mixture containing an excitant between the same and said positive electrode, a negative electrode surrounded by the porous diaphragm and having an uneven surface, and a semi solid filling between the surface of the electrode and said diaphragm, substantially as shown and described.

HARRY T. JOHNSON.

Witnesses:
FRANK B. PACKARD,
S. G. METCALF.